Sept. 15, 1953
H. N. ROCKS
2,651,895
INDEXING DEVICE
Filed July 6, 1950
2 Sheets-Sheet 1
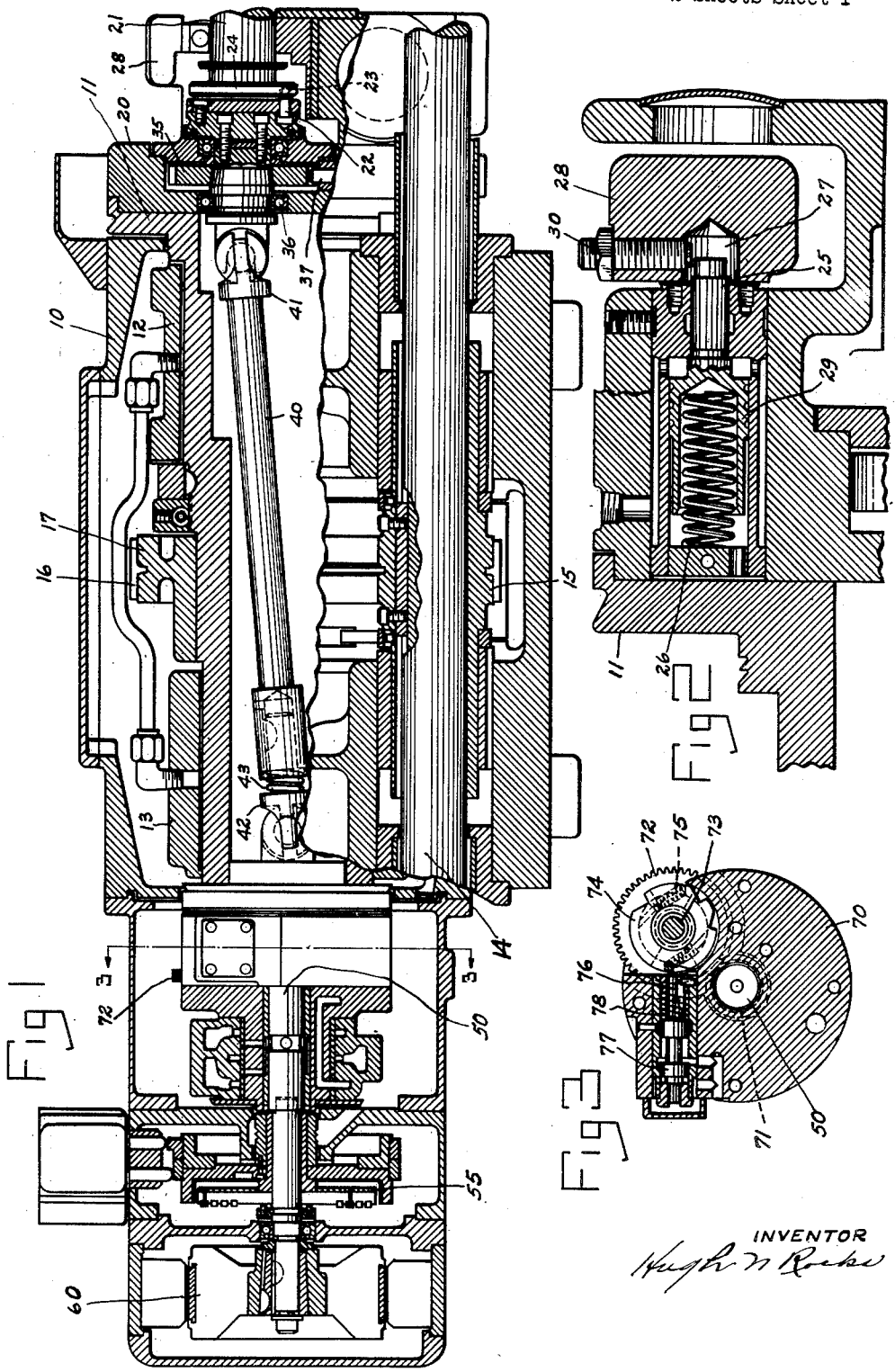
INVENTOR
Hugh N. Rocks Sept. 15, 1953
H. N. ROCKS
2,651,895
INDEXING DEVICE
Filed July 6, 1950
2 Sheets-Sheet 2
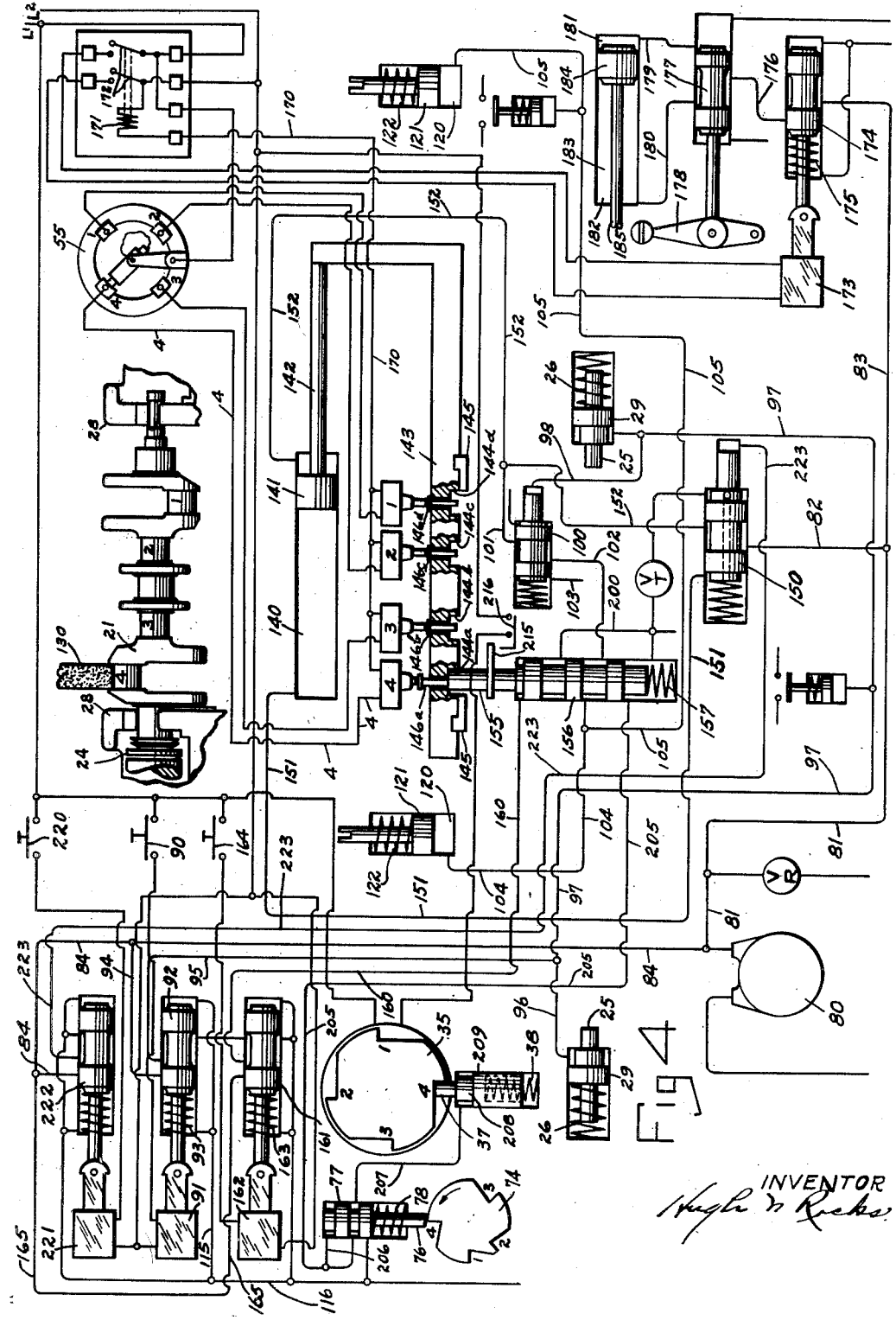
INVENTOR
Hugh N. Rocks Patented Sept. 15, 1953

2,651,895

UNITED STATES PATENT OFFICE 2,651,895

INDEXING DEVICE

Hugh N. Rocks, Waynesboro, Pa., assignor to Landis Tool Company, Waynesboro, Pa.

Application July 6, 1950, Serial No. 172,257

13 Claims. (Cl. 51—216)

This invention relates to crank grinding machines, particularly to apparatus for indexing successive crankpins on a crankshaft to a position in which the entire crank will rotate about the axis of a given pin.

Present methods of crank grinding require that the rotation of the crank be stopped after the grinding of each pin so that the clamping fixture may be opened and the crank rotated relative thereto to bring the next pin on center to be ground. By this method, a considerable portion of the floor-to-floor time for grinding crankshafts is taken up by this indexing operation.

It is, therefore, an object of this invention to provide means whereby the crank may be indexed angularly from one pin to another while the work is being traversed from one pin to another without stopping the rotation thereof.

A further object is to provide means whereby the crankshaft may be rotated independently of the clamping fixture and headstock spindle.

A further object is to provide means for stopping or retarding the rotation of the crankshaft while the rotation of the spindle and clamping fixture continues.

A further object is to provide an indexing apparatus and means for timing the operation thereof.

In the drawings,

Figure 1 is a front sectional elevation of a crank-driving headstock.

Figure 2 is a sectional view of a safety latch which permits a slight opening of the clamping fixture for the purpose of indexing.

Figure 3 is a section along the line 3—3 of Figure 1 showing the apparatus for timing the operation of the index mechanism.

Figure 4 is a combination hydraulic and electrical diagram showing the relation of this invention to the other parts of a crank grinding machine.

Numeral 10 indicates the left-hand head of a crank grinding machine; 11, a spindle rotatably mounted in bearings 12 and 13 in said head. Said head is rotated by means of a motor (not shown) through a drive shaft 14, sprocket 15, chain belt 16, and sprocket 17 on the spindle 11.

A clamping fixture 20 of this type is shown in Patent No. 1,816,750, granted July 28, 1931, and Reissue Patent No. 18,736, granted February 14, 1933. This fixture consists of a pivoted arm, one end of which is connected to a hydraulically actuated piston, the other end of which has means for engaging a work piece. This particular clamping fixture has one feature not disclosed in the above-mentioned patents. This feature consists of a latch member 25 resiliently urged by spring 26 into a recess 27 in clamping arm 28.

Latch 25 is an extension of a piston 29, which may be actuated by fluid under pressure to withdraw latch 25 against the action of spring 26. Latch 25 serves to limit the movement of clamping arm 28 so that said clamp may release the crank sufficiently to permit rotation thereof relative to the clamp, but not enough to permit the crank to be removed from the holding fixture. The amount which the crank may be opened is determined by the adjustment of screw 30.

The end of the crankshaft 21 has attached thereto an index plate 35 rotatably mounted on anti-friction bearings 36 in said clamping fixture 20. Said crank may be located relative to said index plate by means of a pin 22 mounted in fixed relation to plate 35 and adapted to enter a hole 23 in flange 24 of crank 21. Said index plate has a number of equally spaced notches corresponding to the angular spacing of the pins on the crankshaft. In this case, the shaft has four pins spaced at ninety degrees. A plunger 37 is held against said index plate by a spring 38 and acts as a stop to locate said plate and the successive pins of said crankshaft in position to be rotated about their own axes. Attached to said index plate is a shaft 40 having universal joints 41 and 42 at opposite ends thereof, joint 41 serving to connect said shaft to said index plate. Joint 42 connects shaft 40 with a shaft 50.

Said shaft 40 has a connection with joint 42 with a resilient connection between said joint and said shaft in the form of a spring 43.

Shaft 50 serves as a means for rotating several accessory devices such as the timing apparatus shown in Figure 3, an indexing switch 55, and an electrical brake rotor 60.

Said timing apparatus consists of a housing 70, through the center of which passes a shaft 50. On shaft 50 is mounted a gear 71 in engagement with a larger gear 72 on a stub shaft 73. Also mounted on said stub shaft is an index plate 74 having unevenly spaced notches spaced according to the amount of angular index from one pin to another. For example: The angular distance between adjacent pins in the direction in which indexing takes place might be two or three times the minimum angular distance between said pins. In other words, adjacent pins might be only 90° apart in one direction of rotation and might be 270° apart in the opposite direction. The connection between said timer index plate 74 and said stub shaft is spring loaded by springs 75. The speed ratio between gears 71 and 72 is 2:1 in this particular case, but it may be 3:1 or 4:1 as may be required for six cylinder or 8 cylinder in-line crankshafts. A plunger 76 forms the stem of a valve 77. Said plunger is held out of engagement with index plate 74 by means of a spring 78. Said plunger is urged into operative relation with said index plate 74 by fluid under pressure introduced at the end of the valve opposite said spring.

So long as said plunger is held away from index plate 74 by said spring 78, fluid under pressure is directed to hold plunger 37 out of engagement with index plate 35. The reason for the uneven spacing of the notches on index plate 74 is due to the fact that, while each of the four pins on the crankshaft has a different axis and the four axes are equally spaced, successive pins will not necessarily be ninety degrees apart. It is, therefore, necessary sometimes while indexing the shaft axially from one pin to the next, to index the shaft angularly through 180 or 270 degrees. In such cases, plunger 37 must skip one or two notches in index plate 35.

The means for effecting relative longitudinal movement between the work piece 21 and grinding wheel 130 consists of a cylinder 140 in which is slidably mounted a piston 141. Said piston may be connected through piston rod 142 to the work supporting carriage of a grinding machine (not shown). However, it is shown as connected to a spacing bar 143 which, in actual practice, is mounted on the carriage of the machine. Fluid under pressure for driving said piston 141 is supplied by pump 80 through line 81, line 82 to reversing valve 150, through which it is directed alternately through line 151 to the head end of cylinder 140 and through line 152 to the rod end of said cylinder. The means for stopping the longitudinal movement intermittently for grinding successive crankpins includes spaced notches 144 in spacing bar 143 corresponding to the spacing of the pins to be ground on the crankshaft.

Adjacent each of the end notches is a stop block 145 to prevent accidental movement of the carriage beyond the two end notches. In each of said notches is a vertical plunger 146, one end of which engages the actuating element of an electric switch.

A plunger 155 formed integrally with valve 156 is held in engagement with said spacing bar by spring 157. Said plunger may be withdrawn from said spacing bar by introducing fluid under pressure from line 160 into the upper end of said valve. Fluid under pressure for line 160 is supplied from a spacing valve 161 actuated in one direction by solenoid 162 and in the opposite direction by spring 163. Solenoid 162 may be energized by push button switch 164 to shift valve 161 to the left against spring 163. When so positioned, said valve directs fluid under pressure from line 84 through line 165 to said valve, which directs it through line 160 to the upper end of plunger valve 156.

*Operation*

With all parts in the position shown in Figure 4, clamping arms 28 are opened by pressing push button switch 90 to energize solenoid 91, shifting latch valve 92 to the left against spring 93 and directing fluid under pressure from lines 84 and 94 through line 95 and lines 96 and 97 to shift latch pistons 29 against the action of springs 26 and thus withdraw latches 25 to permit opening of clamping arms 28.

A line 98 leads from line 97 to actuate valve 100, moving said valve to the left to block off pressure line 101 and connect line 102 with exhaust line 103. In the normal position of valve 100, fluid under pressure from line 101 passes through line 102, plunger valve 156, and lines 104 and 105 to clamping cylinders 120, actuating pistons 121 therein against the action of springs 122 to move clamping arms 28 into engagement with a work piece. With valve 100 under pressure from line 98 and line 102 connected to exhaust 103, the fluid for actuating the clamps is permitted to escape and the clamps are opened by springs 122.

An unground crank 21 is then placed in the clamps 28 and rotated until hole 23 in flange 24 is engaged by pin 22. The crank is then in position with No. 4 pin on center to be ground. Push button switch 90 is released, and fluid under pressure in line 95 holding latches 25 in inoperative position and valve 100 in the left-hand position is permitted to exhaust from valve 92 through exhaust lines 115 and 116. Fluid under pressure from line 101 is then directed through valve 100 and line 102, plunger valve 156, and lines 104 and 105 to clamp cylinders 120 to move clamps 28 into contact with crank 21. Releasing pressure in lines 96 and 97 permits springs 26 to move pistons 29 and latches 25 into the position shown in Figure 2. Reduction of pressure in clamp cylinders 120 will permit opening of said clamps, but only to an extent limited by latches 25. A slight adjustment of said opening may be effected by means of adjustable stops 30.

With the parts in the position shown, that is, plunger 155 in notch 144a and No. 4 pin of crank 21 positioned to rotate about its own center, an electric circuit is closed by means of plunger 155, holding switch plunger 146 in position to close spacing bar switch 4. Rotary switch 55, which rotates with the crankshaft when it is being positioned angularly, is in position to close a circuit to contact 4 thereon. Thus, the complete circuit is from L1 through contact 4 of switch 55, line 4, spacing bar switch 4, and common line 170 to relay 171 of feed switch 172. Closing said switch energizes feed control solenoid 173.

When so energized, solenoid 173 shifts valve 174 to the left against spring 175, connecting pressure line 83 with line 176 to supply reversing valve 177. Said valve may be shifted manually by lever 178 to direct fluid under pressure alternately through lines 179 or 180 to the head end 181 or the rod end 182 of cylinder 183. Piston 184 in said cylinder is connected by means of piston rod 185 to a wheelbase (not shown) in which the grinding wheel 130 is mounted. Thus, unless the pin which has been placed on center corresponds to the notch in which the plunger is dropped, the circuit to relay coil 171 will not be completed; and switch 172 will remain open. Solenoid 173 will remain in the position shown, and valve 174 will be held by spring 175 in the position shown also to prevent a supply of fluid from reaching reversing valve 177. Under these conditions, therefore, the feed piston 184 is inoperative; and it is impossible to move grinding wheel 130 into grinding position with a pin which is not on center to be ground.

After pin No. 4 has been ground to size, the operator closes push button switch 164 to energize solenoid 162 and shift spacing valve 161 to the left against spring 163. In this position, fluid under pressure from line 84 passes through line 165 and is directed by valve 161 to line 160 leading to the upper end of plunger valve 156 and moving said valve downwardly against spring 157. When said plunger is withdrawn from notch 144a in spacing bar 143, fluid under pressure is directed through reversing valve 150 and line 152 to the left-hand end of cylinder 140 to shift spacing bar 143 and work piece 21 to the left.

In the withdrawn position, valve 156 connects lines 104 and 105, which supply clamp cylinders 120, with exhaust passage 200. Lines 104 and 105 thus permit the escape of fluid under pressure from clamping cylinders 130, permitting clamp 28 to be opened by springs 122. The extent of this opening movement, however, is restricted by latches 25 so that the clamp 28 moves only enough to permit rotation of crank 21 therein.

Valve 156 also connects line 102 from valve 109 to direct fluid under pressure through line 205 to timer valve 77. Fluid from line 205 passes through line 206 to the upper end of valve 77, urging it downwardly against spring 78. At the lower end of said valve is a plunger 76, which is held in engagement with timer index plate 74.

Line 205 also directs fluid through valve 77 and line 207 to one end of cylinder 208 to shift piston 209 and plunger 37 downwardly against spring 38, withdrawing said plunger from engagement with index plate 35.

When plunger 155 is withdrawn from any of the notches in the spacing bar, a finger 215 thereon actuates switch 216 to energize magnetic brake 60. Plunger 37 and its associated actuating elements are mounted in clamping fixture 28. When said plunger is withdrawn from index plate 35 as described above, it continues to rotate at the same rate along with clamp 28. However, brake 60 on shaft 50 prevents continued rotation of said shaft and associated parts, as well as crank 21, at the same rate as clamp 28. Thus, there is a relative rotating movement between plunger 37 and index plate 35, to which crank 21 is attached.

Said plunger 37 moves in a counterclockwise direction in Figure 4; and when moving in this direction, the angular spacing between pin No. 4 and pin No. 3 is 270 degrees. This means that plunger 37 must be held out of contact with index plate 35 until it has passed the notches corresponding to pins 1 and 2. This is accomplished by holding valve 77 in the position shown until plunger 37 has moved relative to index plate 35 between the notch corresponding to pin No. 1 and that corresponding to pin No. 3. Valve 77 is held in this position by timer index plate 74 which, as described previously, rotates at only half the speed of index plate 35.

During a grinding operation, spindle 11, shaft 50, timer housing 70, switch 55, and brake rotor 60 rotate as a unit. When said brake is energized, it retards the rotation of shaft 50; but the housing 70 continues to rotate with spindle 11. The extent of retardation of shaft 50 may be adjusted by adjusting the excitation of said brake. In actual practice, the shaft 50 is retarded but not stopped. However, for the purpose of simplifying the description, we will assume that said shaft is stopped. Housing 70, including timer index plate 74, gear 72 attached thereto, and valve 77, rotates in an orbital path about shaft 50 and gear 71 thereon. The ratio between gear 71 and gear 72 is such that housing 70 must make two complete revolutions while said gear 72 and plate 74 make one revolution. Therefore, while plate 74 rotates from notch 4 to notch 3 an angular distance of 135 degrees, plunger 37 rotates in a counterclockwise direction from notch 4 of plate 35 past notches 2 and 1 before reaching notch 3, which in this direction is spaced 270 degrees from notch 4.

When plunger 76 engages notch 3 on plate 74, it permits valve 77 to move to a position to connect line 207 from plunger cylinder 208 with exhaust line 116. Spring 38 then moves plunger 37 inwardly in time to engage notch 3 and stop the relative rotation between crank 21 and clamp 28. The angular position of rotating arm 56 of switch 55 has changed to close a circuit through contact 3. At about the same time, plunger 155 drops into notch 144b, stopping the longitudinal movement, traverse piston 141, spacing bar 143, and crank 21 with pin No. 3 in alignment with grinding wheel 130. Plunger 146b, actuated by plunger 155, closes switch 3 which, along with contact 3 of switch 55, completes a circuit to energize feed relay 171.

Plunger valve 156 has returned to position to connect line 102 with lines 104 and 105 to close clamps 28. Since the shaft has been properly indexed, both longitudinally and angularly, and relay 171 energized to close switch 172, solenoid 173 shifts feed valve 174 to the left to make fluid under pressure available for feeding grinding wheel 130 into position to grind pin No. 3. The above-described cycle is repeated until all the pins on the shaft have been ground.

After No. 1 pin has been ground, plunger 155 is withdrawn from notch 144d by closing push button switch 164 to energize solenoid 162 and shift valve 161 to the left, thus directing fluid under pressure from line 84 to line 160 to the top of plunger valve 156. Push button switch 220 is then closed to energize solenoid 221 and shift valve 222 to the left, directing fluid under pressure from line 84 through line 223 to the right-hand end of reversing valve 150. Said reversing valve is thus shifted to the left to direct fluid under pressure from line 82 through line 151 to the left end of traverse cylinder 140. Piston 141, attached to the work carriage (not shown), and spacing bar 143 move to the right along with work piece 21 to place said work piece in the position shown in Figure 4.

While plunger 155 has been withdrawn and valve 156 shifted to the lower position, fluid under pressure from line 206 is connected with line 205 to timing plunger valve 77 and plunger cylinder 208 to withdraw plunger 37 from notch 1 on plate 35.

Withdrawal of plunger 155 is effected through finger 215, closing the circuit through switch 216 to energize magnetic brake 60. In the lower position of valve 156, lines 104 and 105 to clamping cylinders 120 are connected with an exhaust line, thus permitting opening of clamps 28 to the extent permitted by latches 25. Thus, when brake 60 is energized, the headstock spindle and clamping fixture continue to rotate at the same speed; but the speed of rotation of the crank is retarded so that the relative angular position of the crank and the clamping fixture is changed. In this case, plunger 37 is held out of engagement with index plate 35, while timer index plate 74 rotates through the distance from notch 1 to notch 4, the equivalent of 180 degrees of rotation of the index plate 35. Therefore, the crank 21 has been indexed angularly to the starting position with pin No. 4 on center.

Push button switch 90 is then closed to energize solenoid 91 to shift valve 92 to the left and direct fluid under pressure from line 94 through lines 96 and 97 to withdraw latches 25 to inoperative position against springs 26. Clamps 28 may then be opened to full extent by springs 122 and the finished crank removed from the machine.

While the apparatus disclosed herein is for the purpose of stopping or retarding rotation of the crankshaft relative to the crank clamping fixture, the invention also contemplates apparatus for driving the crankshaft temporarily at a speed greater than the clamping fixture.

I claim:

1. In a machine for grinding crankshafts, a pair of headstocks, each having a spindle, a clamping fixture rotatably mounted thereon for holding a crankshaft eccentrically whereby to rotate the shaft about the axis of one of said pins, means for rotating said spindle and fixture, means for indexing said shaft angularly in said fixture, including an index plate eccentrically mounted relative to said spindle axis and having connection between said index plate and said crank shaft, a shaft rotatably mounted in the outer end of said spindle and having a braking mechanism thereon, said second shaft connecting said index plate and said first mentioned shaft.

2. In a machine for grinding crank shafts having a plurality of axially and angularly spaced crank pins thereon, a work support, a pair of axially spaced work heads thereon, each having a spindle rotatably mounted therein, a clamping fixture rotatably mounted on said spindle for holding a crank shaft eccentrically whereby to rotate the shaft about the axis of one of said pins, an index plate rotatably mounted in said fixture and having notches corresponding to the angular spacing of said crank pins, a plunger on said fixture for locking said index plate against rotation relative to said clamping fixture, an index shaft one end of which is attached to said index plate and therefor eccentric with respect to said spindle, the other end being concentric with said spindle, said shaft being normally rotatable in fixed relation with said spindle and braking means attached to the concentric end of said shaft for retarding or stopping rotation thereof with said spindle.

3. In a machine for grinding crank shafts, having a plurality of axially and angularly spaced crank pins thereon, a pair of headstocks each having a clamping fixture rotatably mounted therein for holding a crank shaft eccentrically whereby to rotate the shaft about the axis of one of said pins, means for indexing said shaft angularly in said clamping fixtures comprising an index plate having notches corresponding to the angular spacing of said crank pins, a plunger on said clamping fixture for locking said index plate against rotation relative to said clamping fixture, a piston on said plunger, means for causing said index plate to rotate temporarily at a rate different from the rate of rotation of said clamping fixtures, said means being effective also to direct fluid under pressure to withdraw said plunger from said index plate.

4. In a machine for grinding crank shafts, having a plurality of axially and angularly spaced crank pins thereon, a pair of headstocks each having a clamping fixture rotatably mounted therein for holding a crank shaft eccentrically whereby to rotate the shaft about the axis of one of said pins, means for indexing said shaft angularly in said clamping fixtures comprising an index plate having notches corresponding to the angular spacing of said crank pins, a plunger on said clamping fixtures for locking said index plate against rotation relative to said clamping fixtures, a piston on said plunger, means for causing said index plate to rotate temporarily at a rate different from the rate of rotation of said clamping fixtures, said means being effective also to direct fluid under pressure to withdraw said plunger from said index plate, and means for effecting said index movement through an angle greater than the angle between adjacent crank pins comprising a secondary index plate having unequally spaced notches therein and geared to said first index plate to rotate at a fraction of the speed of said index plate and a valve actuated in conjunction with said secondary index plate for directing fluid to withdraw said first-mentioned plunger and to prevent said plunger from entering one or more notches on said first index plate.

5. In a machine for grinding crank pins, a work support, a pair of headstocks rotatably mounted thereon, a grinding wheel support, a grinding wheel rotatably mounted thereon, means for effecting intermittent relative longitudinal movement between said supports comprising a motor attached to said work support, a spacing bar having notches spaced according to the pins on the crank shaft, a plunger for engaging said notches, clamping fixtures rotatably mounted in each of said headstocks for holding a crank shaft eccentrically whereby to rotate the shaft about the axis of one of the pins, means for indexing said shaft angularly comprising means for retarding rotation of said shaft while said clamping fixtures rotate through an angle equal to the angle between adjacent crank pins, control means for initiating said longitudinal movement of said carriage, said control means and said retarding means being actuated by said plunger upon withdrawal thereof from said spacing bar.

6. In a machine for grinding crank pins, a work support, a pair of headstocks mounted thereon, each having a clamping fixture rotatably mounted thereon for holding a crank shaft eccentrically whereby to rotate the shaft about the axis of one of said pins, means for indexing said shaft angularly comprising means for retarding rotation thereof while said clamping fixtures rotate through an angle equal to the angle between adjacent crank pins, a grinding wheel support, a grinding wheel rotatably mounted thereon, means for effecting intermittent relative longitudinal movement between said work supports and said grinding wheel support comprising a motor for moving said work support, a spacing bar having notches spaced according to the spacing of the pins of the crank shaft, a plunger for engaging said notches, control means actuated by said plunger upon withdrawal from said spacing bar for initiating said longitudinal movement of said carriage and additional control means operable by said plunger for actuating said retarding means.

7. Apparatus for grinding crank shafts having a plurality of axially and angularly spaced crank pins thereon comprising a pair of headstocks for rotatably supporting a crank shaft, a grinding wheel, means for effecting relative longitudinal and transverse movement between a crank shaft and said grinding wheel, including a spacing bar having notches spaced in accordance with the spacing of the pins on said crank shaft and a plunger for engaging said notches, a clamping fixture rotatably mounted in each of said headstocks for holding a crank shaft eccentrically whereby to rotate the shaft about the axis of one of said pins, means for indexing said shaft angularly relative to said headstock, a multi-pole switch having an element rotatable with said shaft during said angular index thereof, a switch in each of the notches of said spacing bar, each of said switches in said spacing bar being connected in series with one of the poles in said multi-pole switch and with said transverse moving means, said spacing bar switches being actuated by said plunger when it enters each notch.

8. In a machine for grinding crank shafts having a plurality of axially and angularly spaced crank pins thereon, a work support, a pair of axially spaced work heads thereon, each having a spindle rotatably mounted therein, a clamping fixture on said spindle for holding a crank shaft eccentrically whereby to rotate the shaft about the axis of one of said pins, an index plate eccentrically and rotatably mounted in said fixture coaxially with said crank shaft and having peripherally spaced notches corresponding to the angular spacing of said crank pins, a plunger on said fixture for engaging said notches for locking said index plate against rotation relative to said clamping fixture, braking means for retarding or stopping rotation of said index plate and crank shaft about their common axis.

9. In a machine for grinding crank shafts having a plurality of axially and angularly spaced crank pins thereon, a work support, a pair of axially spaced work heads thereon, each having a spindle rotatably mounted therein, a clamping fixture on said spindle for holding a crank shaft eccentrically whereby to rotate the shaft about the axis of one of said pins, an index plate eccentrically and rotatably mounted in said fixture coaxially with said crank shaft and having peripherally spaced notches corresponding to the angular spacing of said crank pins, a plunger on said fixture for engaging said notches for locking said index plate against rotation relative to said clamping fixture, braking means for retarding or stopping rotation of said index plate and crank shaft about their common axis, means operated in timed relation with said braking means for withdrawing said plunger from said index plate whereupon said spindle rotates relative to said plate until said plunger drops into another notch and thereby locates another crank pin on center to be ground.

10. In a machine for grinding crank shafts a pair of headstocks each having a clamping fixture rotatably mounted therein for holding the crank shaft eccentrically whereby to rotate the shaft about the axis of one of the pins, means for closing said clamping fixture to hold a crank shaft rigidly for a grinding operation, and for opening said clamping fixture to place a crank therein or to remove a crank therefrom, means for indexing a shaft angularly comprising means for retarding rotation of said shaft while said clamping fixtures continue to rotate through an angle equal to the angle between adjacent crank pins and means for restricting the opening of said clamping fixture to an extent sufficient only to permit such relative rotation between said crank shaft and said clamping fixture.

11. In a machine for grinding crank shafts having a plurality of axially and angularly spaced crank pins, a work support, a pair of headstocks rotatably mounted thereon, a grinding wheel support, a grinding wheel rotatably mounted thereon, means for effecting intermittent relative longitudinal movement between said supports to successively position said spaced crank pins in operative relation with said grinding wheel, a clamping fixture rotatably mounted in each of said headstocks for holding a crank shaft eccentrically whereby to rotate the shaft about the axis of one of said pins, means for indexing said shaft angularly in said fixtures, means for opening said clamping fixtures to permit said angular indexing, and means for limiting the extent of opening said clamping fixtures for indexing.

12. In a machine for grinding crank shafts having a plurality of axially and angularly spaced crank pins, a work support, a pair of headstocks rotatably mounted thereon, a grinding wheel support, a grinding wheel rotatably mounted thereon, means for effecting intermittent relative longitudinal movement between said supports to successively position said spaced crank pins in operative relation with said grinding wheel, a clamping fixture rotatably mounted in each of said headstocks for holding a crank shaft eccentrically whereby to rotate the shaft about the axis of one of said pins, means for indexing said shaft angularly in said fixtures, means for opening said clamping fixtures to permit said angular indexing and means for limiting the extent of opening of said clamping fixtures for indexing, comprising an adjustable stop on said fixture and a latch movable into and out of the path of said stop.

13. In a machine for grinding crank shafts, having a plurality of axially and angularly spaced crank pins, a work support, a pair of headstocks rotatably mounted thereon, a grinding wheel support, a grinding wheel rotatably mounted thereon, means for effecting intermittent relative longitudinal movement between said supports to successively position said spaced crank pins in operative relation with said grinding wheel, a clamping fixture rotatably mounted in each of said headstocks for holding a crank shaft eccentrically whereby to rotate the shaft about the axis of one of said pins, means for opening said clamping fixtures to permit said angular indexing and means for limiting the extent of opening of said clamping fixtures for indexing, comprising an adjustable stop on said fixture, a latch movable into and out of the path of said stop, and means for moving said latch from the path of said stop after all the pins on a crank shaft have been ground.

HUGH N. ROCKS.

References Cited in the file of this patent

UNITED STATES PATENTS

| Number | Name | Date |
| --- | --- | --- |
| Re. 21,582 | Klingele | Sept. 24, 1940 |
| 2,131,233 | Ott et al. | Sept. 27, 1938 |
| 2,506,495 | Flanders et al. | May 2, 1950 |

FOREIGN PATENTS

| Number | Country | Date |
| --- | --- | --- |
| 570,001 | Germany | Jan. 19, 1933 |